(12) United States Patent
Schaffer et al.

(10) Patent No.: US 9,517,737 B2
(45) Date of Patent: Dec. 13, 2016

(54) RELAY CONTROL BETWEEN POWER DISTRIBUTION CENTER AND BODY CONTROL MODULE

(71) Applicant: Continental Automotive Systems, Inc., Auburn Hills, MI (US)

(72) Inventors: Thomas Scott Schaffer, Shelby Township, MI (US); Randolph W. Scott, Clarkston, MI (US); Scott James Lucy, Lake Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 306 days.

(21) Appl. No.: 13/932,442

(22) Filed: Jul. 1, 2013

(65) Prior Publication Data

US 2015/0006026 A1 Jan. 1, 2015

(51) Int. Cl.
| | | |
|---|---|---|
| *B60W 50/08* | (2012.01) | |
| *B60R 16/03* | (2006.01) | |
| *B60K 37/06* | (2006.01) | |
| *B60K 35/00* | (2006.01) | |
| *G01C 21/26* | (2006.01) | |

(52) U.S. Cl.
CPC ............... *B60R 16/03* (2013.01); *B60K 35/00* (2013.01); *B60K 37/06* (2013.01); *B60W 50/08* (2013.01); *G01C 21/26* (2013.01)

(58) Field of Classification Search
CPC .......... B60K 37/06; B60K 35/00; G01C 21/26
USPC .......................................................... 701/36
See application file for complete search history.

(56) References Cited

U.S. PATENT DOCUMENTS

| | | | | |
|---|---|---|---|---|
| 4,710,922 A | * | 12/1987 | Scott | ......................... H04L 5/22 327/407 |
| 5,371,859 A | * | 12/1994 | Lennartsson | ...... G05B 19/0421 700/3 |
| 6,218,954 B1 | | 4/2001 | Ohuchi et al. | |
| 6,266,710 B1 | | 7/2001 | Dittmer et al. | |
| 6,555,929 B1 | * | 4/2003 | Eaton | .................... F02D 11/105 290/24 |
| 6,700,356 B1 | * | 3/2004 | Dorn | ....................... H02P 9/305 322/44 |
| 6,731,098 B1 | * | 5/2004 | Hintz | ....................... H02H 7/06 322/17 |
| 6,732,204 B2 | * | 5/2004 | Ishida | ................. G06F 13/4059 370/505 |

(Continued)

FOREIGN PATENT DOCUMENTS

| | | |
|---|---|---|
| DE | 2809763 A1 | 9/1979 |
| DE | 102006011170 A1 | 9/2007 |

(Continued)

OTHER PUBLICATIONS

Search Report dated Jul. 16, 2015, from corresponding EP Patent Application No. 14175296.4.

*Primary Examiner* — Jerrah Edwards
*Assistant Examiner* — Majdi Alsomiri

(57) ABSTRACT

Electrical devices in a vehicle engine compartment are controlled from the vehicle passenger compartment over a serial data bus that extends between a relay controller located in the engine compartment and a body control module located in the passenger compartment and which receives commands from various passenger compartment devices. A serial data link passing through the firewall couples the body control module to the relay controller.

18 Claims, 4 Drawing Sheets

(56) References Cited

U.S. PATENT DOCUMENTS

| | | | | |
|---|---|---|---|---|
| 6,987,825 B1* | 1/2006 | Yoshimura | ............. | H03K 5/135 |
| | | | | 327/144 |
| 7,526,017 B2* | 4/2009 | Miyazaki | ............ | G06F 13/4291 |
| | | | | 326/93 |
| 7,634,602 B2* | 12/2009 | Arendt | ................... | G06F 13/423 |
| | | | | 710/105 |
| 7,957,868 B2* | 6/2011 | Warner | ................. | B60W 50/04 |
| | | | | 701/36 |
| 8,046,157 B2* | 10/2011 | Aspelmayr | ............. | F02D 41/20 |
| | | | | 123/480 |
| 2004/0049324 A1* | 3/2004 | Walker | .................... | B60R 25/02 |
| | | | | 701/1 |
| 2004/0164589 A1 | 8/2004 | Glovatsky et al. | | |
| 2008/0219274 A1* | 9/2008 | Kato | ................... | H04L 12/4625 |
| | | | | 370/401 |
| 2011/0320063 A1* | 12/2011 | Molinaro | ............... | B62K 11/14 |
| | | | | 701/1 |
| 2013/0082521 A1* | 4/2013 | Callicoat | ................... | B60L 1/00 |
| | | | | 307/10.1 |
| 2013/0093324 A1* | 4/2013 | Brown | ................. | B60Q 1/1407 |
| | | | | 315/77 |

FOREIGN PATENT DOCUMENTS

| | | | |
|---|---|---|---|
| EP | 1282273 | A1 | 2/2003 |
| FR | 2437038 | A1 | 4/1980 |

\* cited by examiner

RELAY CONTROL BETWEEN POWER DISTRIBUTION CENTER AND BODY CONTROL MODULE

BACKGROUND

Many accessory devices in a vehicle require relatively large amounts of current to operate. A vehicle's horn, air conditioner compressor clutch, blower motor and electric heaters are examples of accessory devices that require more electric current than most semiconductors are able to provide. The current that such devices require is usually provided to them using conventional, high-current relays, the actuations of which are controlled by a processor responsive to the processor detecting actuation of a control device for the accessory. These high current relays are preferably located in the engine compartment for safety but must nevertheless be controlled from the passenger compartment.

FIG. 1 depicts a prior art system 100 for controlling relays in a vehicle engine compartment from the passenger compartment. The system 100 comprises a passenger compartment-located body control module or "BCM" 102. The BCM 102 is comprised of a processor 104 (microcontroller or microprocessor). The processor 104 has conventional address/data/control lines 106, at least some of which are electrically coupled, i.e., interfaced, to an engine compartment-located power distribution center (PDC) 108 through a set of protective drivers 110, which pass through the vehicle's firewall 105, because they "drive" relay coils 113, which are inherently inductive.

The BCM 102 is electrically coupled to and receives electrical signals from various controls that are located in the passenger compartment for various electrical accessory devices located through-out the vehicle. Such inputs to a BCM 102 are well known to those of ordinary skill in the art and omitted from the figures for brevity.

When a driver or vehicle occupant wants to operate an electrically-powered accessory that requires more current that a processor or similar device can reliably provide by itself, the current for such a device is preferably provided to the device by the actuation of a high-current relay located on the engine compartment-located PDC 108. FIG. 1 thus shows the PDC 108 as having relays 112 that provide electrical battery power to various electrical loads 116. The relays 112 actuate a load, i.e., provide electric current to a load, responsive to electrical signals sent to the coils 113 of the relays 112 by the processor 104 located in the BCM 102, albeit through the current driver 110. The engine compartment-located relays on the PDC 108 are thus controlled by the processor 104, which is located in the BCM 102.

Unfortunately, the prior art requires each relay on a PDC 108 to have at least one, relay control wire connected to the processor 104. Since many vehicles require high reliability and maintainability, the PDC-located relays are also preferably "testable" by the processor 104 by being provided with sets of auxiliary diagnostic contacts 116, the opening and closure of which can be tested by the processor 104 using dedicated diagnostic test wires 118, which also extend between the relays 112 and processor 104. The multiple test wires 118 and relay control wires 120 that extend between the protective driver 110 and relay coils 113 make the connection between a BCM 102 and PDC 108 costly and actually decrease a vehicle's reliability. Reducing the number of wires and/or connectors that extend between a passenger compartment-located body control module and an engine compartment-located power distribution center would be an improvement over the prior art.

DETAILED DESCRIPTION

Figure 2:
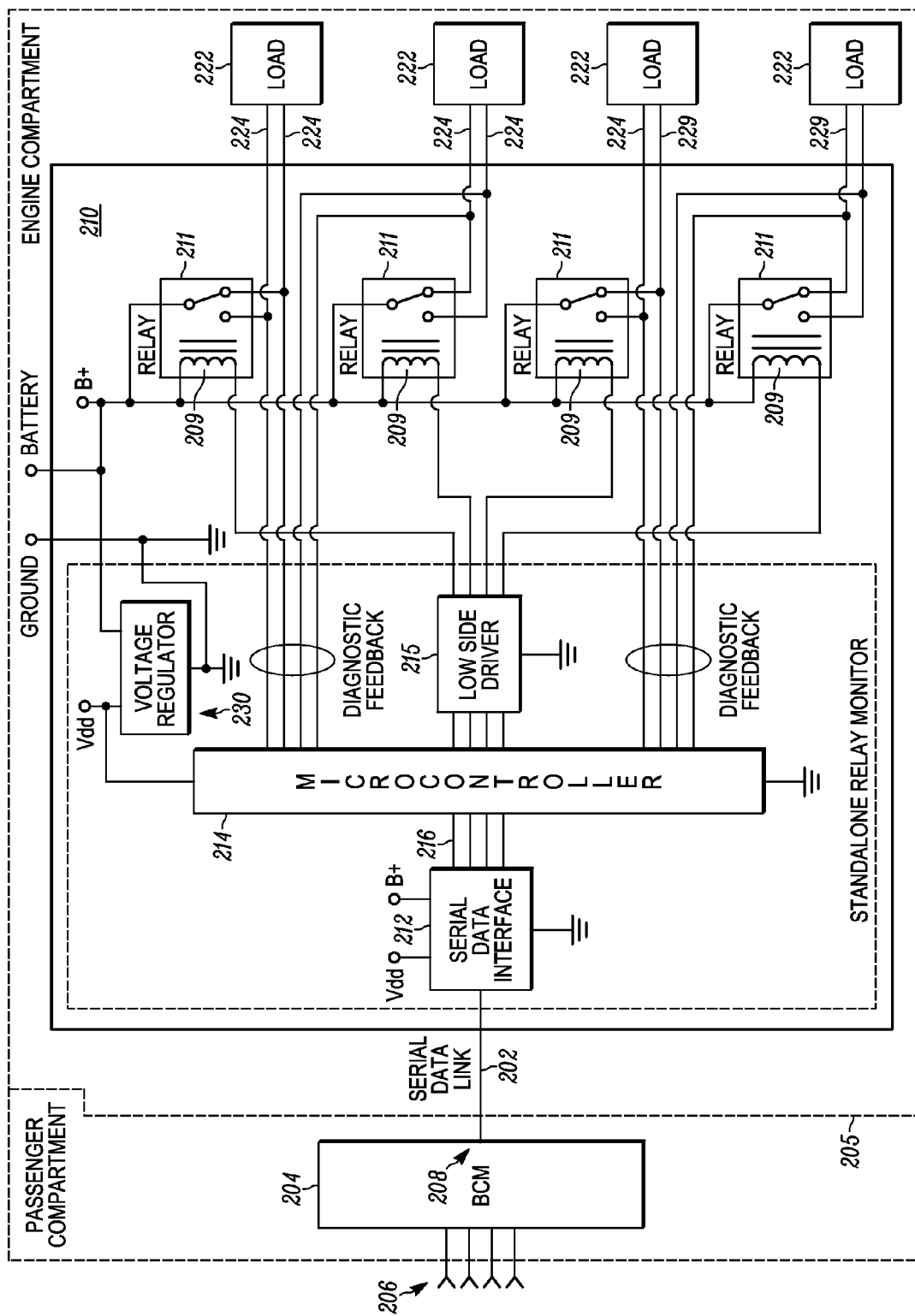
FIG. 2 depicts a block diagram of a system for controlling electrical devices, such as high current relays in an engine compartment from the passenger compartment.

FIG. 2 depicts a system 200 for controlling electrical devices in an engine compartment from the passenger compartment via a serial data link 202, depicted in FIG. 2 as a single line but which can be physically embodied in a vehicle as a one, ungrounded conductor with the vehicle chassis providing a reference potential conductor. In a preferred embodiment, however, the data link 202 is provided as either a coaxial cable or a "twisted pair" of wires, well known to those of ordinary skill in the art.

Figure 1:
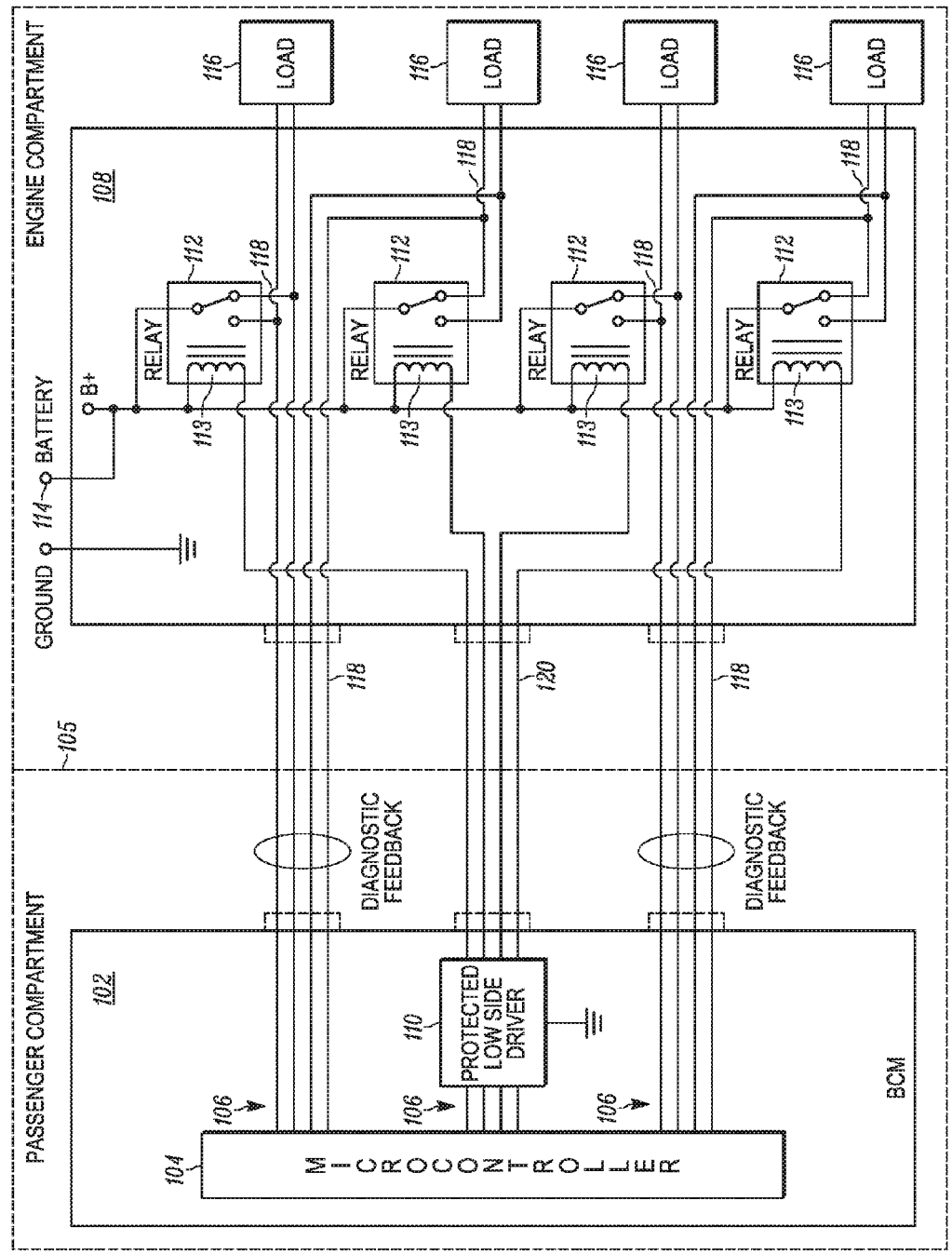
FIG. 1 depicts a block diagram of a prior art system for controlling various high-current load relays in an engine compartment from the passenger compartment.

Similar to the prior art embodiment shown in FIG. 1, the system 200 shown in FIG. 2 has a body control module or "BCM" 204 located in the passenger compartment where temperature and humidity levels are less hostile to semiconductors than are the temperature and humidity levels in an engine compartment. The body control module 204 preferably comprises at least one microprocessor or microcontroller, not shown, having a series of input terminals or ports 206 that are coupled to various controls for various vehicle accessories such as the vehicle horn, climate control system blower, electric seat heaters and the like. When a vehicle passenger or driver operates or actuates a device requiring a large amount of current, the processor in the body control module 204 senses the signal generated by actuation of the device and generates a corresponding serial-data control signal that is sent to a relay controller 210 located in the engine compartment.

Since many electrically-powered vehicle accessories can be actuated separately and independently from each other, they can also be actuated simultaneously. If two or more accessories are actuated at the same time, the BCM 204 will thus receive inputs from two devices at the same time. The BCM 204 will preferably generate two different serial data signals or packets, which are sent to a relay controller 210 successively, i.e., one after the other. In an alternate embodiment, a single, serial data packet is sent, the contents of which are changed according to the number and identity of electrical accessories that need to be activated. In either case, the BCM 204 operates as a parallel-to-serial converter: it converts signals that it can be received simultaneously or which are virtually simultaneous into serial data representing the various inputs that were received "in parallel" to each other.

The serial data control signal generated by the BCM 204 in response to actuation of an accessory device in the passenger compartment is output to a bi-directional serial data interface 208 on the BCM 204, which is also considered to be an output control port or terminal for various relays located on a relay controller located in the engine compartment. The protocols or standards to which the ports are electrically and mechanically compliant, is a design choice as is the format of data transmitted and received through them. The relays in the engine compartment selectively provide electric power to electrical loads responsive to voltages output from the BCM on the serial data interface 208. The serial data interface 208 on the BCM 204 is also able to receive serial data from the serial data link 202. Information can thus be sent back to the BCM 204.

The serial data interface 208 on the BCM 204 is electrically connected to the aforementioned serial data link 202. The serial data link 202 passes through an opening in a firewall 205, which is a steel wall separating the engine compartment and passenger compartment. The serial data link 202 is electrically connected to a mating serial data interface 212 on the relay controller 210, which is located in the engine compartment.

The serial data link 202 is considered herein to have a "first" end connected to the serial data interface 208 on the BCM 204 and an opposite "second" end coupled to an identical serial data interface or port 212 located on the relay controller 210. Similar to the processor 102 shown in FIG. 1, which requires protective drivers 110 on the outputs of the processor 102, the outputs of the processor 214 on the relay controller 210 also require protective drivers 215 because the processor 214 controls various inductive loads embodied as the coils 209 of the various relays 211 that provide power to and thus control various electrical accessory loads 222, most of which are themselves inductive. The relay controller 210 also includes its own voltage regulator 230.

Most of the electrical loads 222 controlled by relays 211 on the relay controller 210 are located off the relay controller 210 and are themselves susceptible to failure. When an electrical accessory stops working, it is possible to determine whether the failure is due to a relay 211 using diagnostic sense lines 224, which are coupled to the processor 214. The processor 214 is thus able to "read" or sense when the contacts of a relay are closing.

As used herein the term "bus" refers to a set of electrically-parallel conductors in a computer or computer system, which form a main transmission path. The processor 214 on the relay controller 210 is a conventional processor; it therefore has a bus comprising electrically parallel address/data/control lines 216. The lines of the bus carry signals, which cause various devices connected to the bus to operate.

In FIG. 2, the relay controller processor 214 receives commands, information and data from the BCM 204 in the form of serial data or data packets. It is able to receive signals from the several relays diagnostic sense lines 224 simultaneously, i.e., in parallel. It converts such "parallel data" to a serial form and transmits that data to the BCM 204 through the serial data interface 212 to which the bus conductors are electrically connected. Stated another way, the serial data interface 212 in the engine compartment-located relay controller 210 converts serial data received from the BCM 204 into parallel data, which is impressed on the bus of the processor 214 on the relay controller 210 so that the processor 214 can "understand" and respond to commands and information that are sent to it by the BCM. The serial data interface 212 thus functions as a parallel-to-serial converter.

The serial data interface 212 also receives signals from the processor 214 on the electrically-parallel conductors of the bus 214 and converts those bus signals to a serial format and sends them to the BCM 204 via the serial data link 202. The serial data interface 212 therefore functions as a parallel-to-serial converter, depending on the direction that data is to flow.

In a preferred embodiment, the serial data link 202, which couples the body control module 204 to the relay controller 210 through the firewall 205 is preferably a controller area network (CAN) or local interconnect network (LIN) both of which are well known in the automotive art. The serial data link 202 is thus able to transfer data bi-directionally, i.e., to the relay controller 210 from the BCM 204 and from the relay controller 210 to the BCM 204. The serial data link thus carries data from the passenger compartment into the engine compartment and vice-versa.

Figure 3:
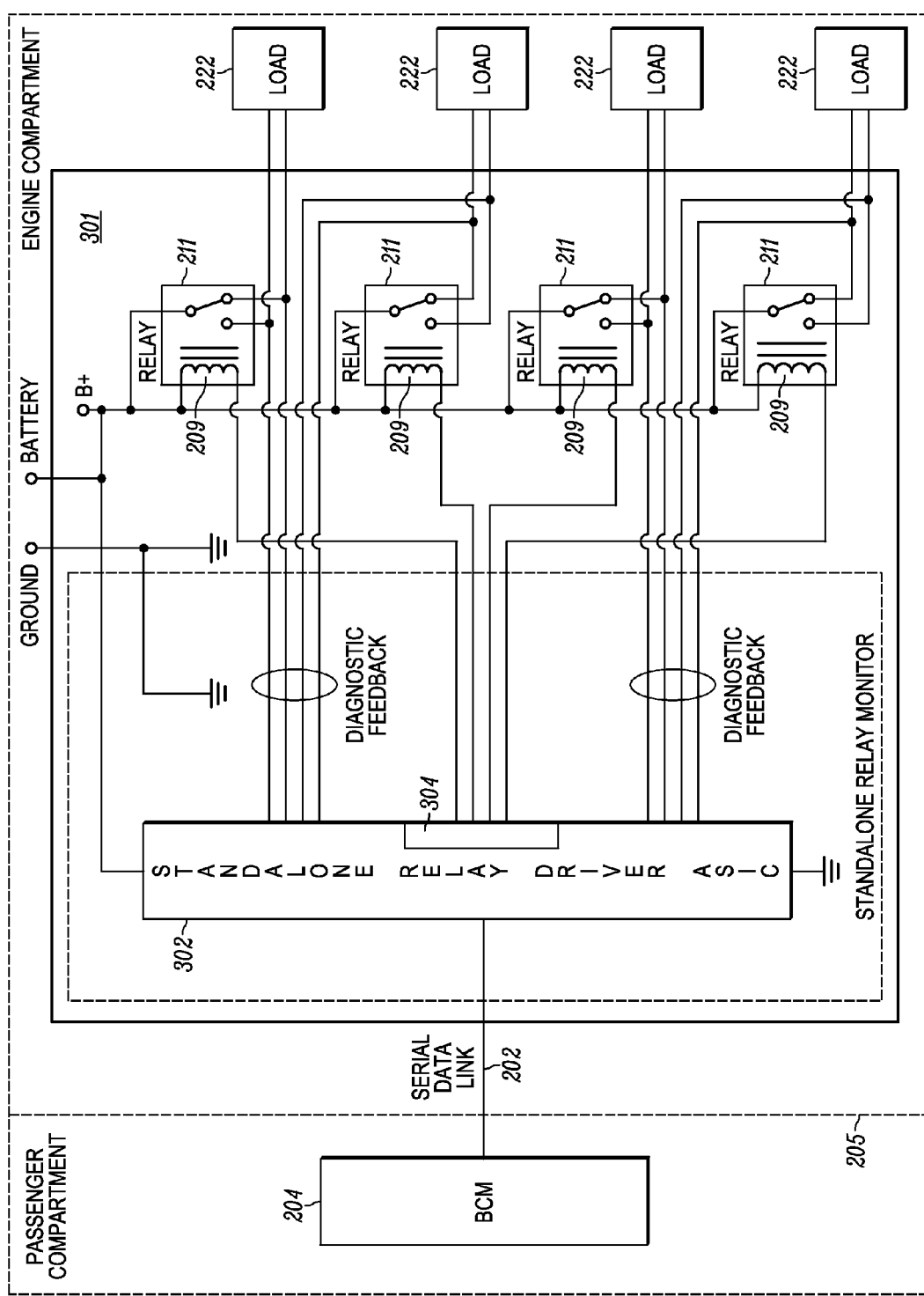
FIG. 3 depicts an alternate embodiment of a system for controlling electrical devices in an engine compartment from a passenger compartment.

FIG. 3 depicts an alternate embodiment of a system 300 for controlling electrical devices in an engine compartment from the passenger compartment via a single-conductor serial data link 202. The system 300 shown in FIG. 3 is identical to the system shown in FIG. 2 and differs from the system shown in FIG. 2 in that an application-specific integrated circuit (ASIC) 302 is substituted for the processor 214, the voltage regulator 230, and serial data interface 212.

Figure 4:
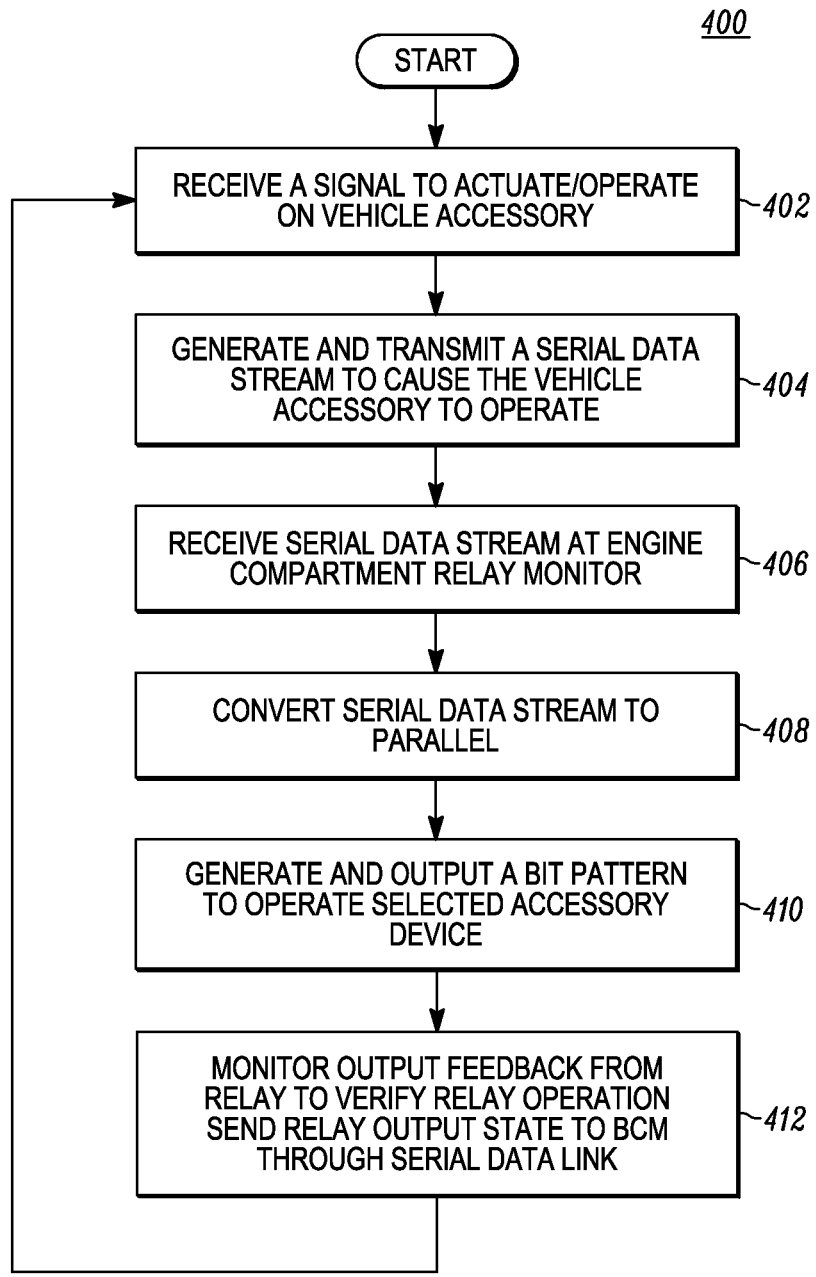
FIG. 4 depicts a method of controlling engine-compartment relays and high-current devices from a passenger compartment using a serial bus.

FIG. 4 depicts steps of a method 400 for controlling and monitoring engine compartment relays and engine compartment loads from a passenger compartment. The method begins at step 402 where a body control module (BCM) receives a signal from a driver or vehicle passenger to actuate or operate a vehicle accessory. Examples of such accessories include a power-operated seat, seat heater, vehicle horn, blower, rear window defogger and the like.

When a command or input from a vehicle accessory is received by the BCM, it generates a corresponding signal to be transmitted onto a serial data link. Step 404 of the method 400 thus comprises transmitting a serial data stream or serial data signal onto a serial data link responsive to the BCM's reception of a signal to operate an accessory. After a serial data stream is generated by the BCM and transmitted onto a serial data link, the engine compartment-located relay monitor receives the serial data stream from the BCM, converts the serial data to a parallel format and, a serial data interface and presents the parallel-format command to a microcontroller or microprocessor for the relay monitor. At step 408, the serial data stream, which contains data, information or otherwise represents the actuation of a particular control to operate a particular accessory is converted into a parallel signal by the serial data interface for presentation to the relay monitor processor. Upon receipt of the converted-to-parallel signal, the microcontroller on the relay monitor generates a signal, at step 410, for output on its address/control/data bus via a low side driver to one or more relays which are coupled to various loads located on the vehicle or in the engine compartment. The signal output from the microcontroller of the relay monitor causes one or more relays to close thereby delivering battery power to the various accessory device.

At step 412, the output state of each relay is output state is fed back to controller from the relays through the various diagnostic sense lines 224 coupled between the relays 211 and controller. Monitoring the output state of each relay makes it possible to actively verify or confirm proper relay operation. The relay output state information is also sent back to the BCM through the serial data link. The method depicted in FIG. 4 is repeated to actuate other accessories.

In a preferred embodiment, the relay controller's electronic devices are sized, selected and arranged to make the relay controller 210 capable of withstanding the high temperatures and humidity level found in an engine compartment. In an alternate embodiment, however, the relay controller 210 can also be located inside a passenger compartment.

In the preferred embodiment and as set forth above, serial data is transmitted over a single conductor, with the vehicle acting as a return or reference potential using either an automotive controller area network protocol or an automotive local interconnect network protocol. The method thus facilitates the elimination of multiple parallel conductors extending from the passenger compartment to the engine compartment to a single conductor improving system reliability and reducing manufacturing cost.

The foregoing description is for purposes of illustration only. The true scope of the invention is set forth in the following claims.

What is claimed is:

1. A system for controlling electrical devices in a vehicle engine compartment, the vehicle comprising a passenger compartment and a firewall separating the engine compartment and passenger compartment, the system comprising:
  a plurality of relays located in the engine compartment, each relay being coupled to at least one load and controlling power provided to said at least one load responsive to signals, which each relay receives from a relay controller, each load being coupled to a diagnostic sense line, which carries signals indicating whether a relay coupled to a load is operational;
  a relay controller located in the engine compartment, the relay controller being coupled to and controlling operation of said relays, the relay controller having a plurality of outputs and a serial port, each output being coupled to a corresponding relay and configured to actuate the relay responsive to a corresponding input signal received by the relay controller at its serial port, the relay controller also having a plurality of inputs, the inputs being coupled to said diagnostic sense lines, the relay controller being configured to receive signals on the diagnostic sense line and format signals received from the diagnostic sense lines into serial signals that are output from the serial port;
  a body control module located in the passenger compartment, the body control module having a serial port, configured to send and receive signals between the serial port of the relay controller;
  a serial data link passing through the firewall and coupling the body control module to the relay controller;
  wherein the serial data link is configured to receive serial data from the body control module and provide serial data from the body control module to the relay control module; and
  wherein the serial data link is additionally configured to receive serial data from the relay control module and provide the serial data from the relay control module to the body control module.

2. The system of claim 1, wherein the relay controller comprises a first serial data interface and a relay monitor processor, the first serial data interface having a first serial data input coupled to the serial data link and a plurality of outputs coupled to the relay monitor processor, the relay monitor processor having a first plurality of inputs coupled to the serial data interface outputs and a second plurality of inputs coupled to the diagnostic sense lines, the relay monitor processor additionally having a plurality of outputs coupled to relays, the relay monitor processor being additionally configured to determine whether a relay is operating responsive to signals on the diagnostic sense lines.

3. The system of claim 1, wherein the relay controller further comprises a plurality of relay current drivers, each driver being coupled between a relay monitor processor output and a relay in the engine compartment.

4. The system of claim 1, wherein the body control module comprises a body control module processor and a second serial data interface, the second serial data interface having a plurality of inputs coupled to corresponding outputs of the body control module processor and having a serial data output coupled to the serial data link.

5. The system of claim 1, wherein the serial data link is configured to carry serial data between the first and second serial data interfaces using a predetermined serial data protocol selected from at least one of: an automotive controller area network (CAN) protocol and an automotive local interconnect network (LIN) protocol.

6. An apparatus for controlling electrical devices in a vehicle engine compartment, the apparatus comprising:
  a body control module comprising a processor having a plurality of parallel inputs and a plurality of parallel outputs;
  a serial data link interface having parallel inputs coupled to the body control module processor parallel outputs and a serial data interface output, the serial data link interface configured to convert signals on the parallel inputs to a predetermined serial data output and configured to convert received serial signals to parallel signals;
  the body control module being configured to be located in a vehicle passenger compartment, the plurality of parallel inputs of the processor being configured to receive an accessory device actuation control signal from a user interface for a corresponding vehicle accessory device, the serial data interface output configured to output a predetermined serial data stream responsive to receipt of an input signal for an accessory device;
  the body control module being additionally configured to receive serial data at the serial data link port, the serial data received at the serial data link port being configured to indicate whether a relay in the engine compartment is working correctly.

7. The apparatus of claim 6, wherein the serial data link interface is additionally configured to transmit serial data onto a serial data link and receive serial from the serial data link, the serial data link being configured to carry serial data into and out of the vehicle engine compartment.

8. The apparatus of claim 6, wherein the serial data link interface is additionally configured to send and receive serial data, the serial data from the engine compartment comprising information that is indicative of the functionality or non-functionality of an engine compartment relay.

9. The apparatus of claim 6, wherein the serial data link interface is configured to transmit serial data onto a serial data link and to receive serial data from the serial data link, the serial data being transmitted and received on the serial data link according to at least one of: an automotive controller area network (CAN) protocol and an automotive local interconnect network (LIN) protocol.

10. An apparatus for controlling electrical devices in a vehicle engine compartment responsive to controls actuated in a vehicle passenger compartment, the system comprising:
  a relay controller, the relay controller comprising a serial input and a plurality of outputs, each output configured to be connected to a corresponding engine compartment-located relay and configured to actuate the connected relay responsive to a corresponding input signal received by the relay controller at its serial input, the input signal comprising serial data received from a passenger compartment-located body control module;
  the relay controller additionally comprising a plurality of parallel inputs configured to receive diagnostic sense signals from devices, which are controlled by power provided to them by relays coupled to said relay controller, the relay controller being configured to format diagnostic sense signals that are received in parallel into a serial data stream for transmission over a serial data link;

wherein the relay controller is configured to be located in both a vehicle engine compartment and a passenger compartment and comprises a relay control processor having a plurality of parallel inputs and a plurality of parallel outputs, the apparatus further comprising a serial data link interface having a serial input configured to receive serial data from a serial data link, and a serial output configured to transmit serial data onto a serial data line, and having a plurality of parallel outputs coupled to corresponding inputs of the relay controller processor.

11. The apparatus of claim 10, wherein the serial data link interface is additionally configured to receive serial data from and transmit serial data to a serial data link, the serial data link being configured to carry serial data into and out of the vehicle engine compartment.

12. The apparatus of claim 10, wherein the relay control processor is additionally configured to receive information from at least one engine compartment relay, said received information being indicative of the functionality or non-functionality of the relay.

13. The apparatus of claim 10, wherein the serial data link interface is configured to transmit serial data onto a serial data link and to receive serial data from a serial data link, the serial data being transmitted and received on the serial data link according to at least one of: an automotive controller area network (CAN) protocol and an automotive local interconnect network (LIN) protocol.

14. A method of controlling and monitoring engine compartment relays from a passenger compartment, the method comprising:

receiving at a passenger compartment-located body control module, a first signal to actuate a vehicle accessory device;

transmitting a second signal, which is serial data stream, onto a serial data link responsive to the reception of the first signal, the serial data stream comprising information representing the first signal;

receiving the second, serial data stream signal at an engine compartment-located relay monitor;

converting the second, serial data stream into a third parallel signal;

transmitting a relay actuation signal to a predetermined relay responsive to converting the second, serial data stream to a third parallel signal;

receiving a relay-operation-indication signal on a diagnostic sense line, which is coupled to a device that is controlled by power provided to the device by the relay actuation signal; and providing the relay-operation-indication signal to the passenger compartment-located body control module via serial data link.

15. The method of claim 14, wherein the step of transmitting a second, serial data stream onto a serial data link comprises transmitting data according to at least one of: an automotive controller area network (CAN) protocol and an automotive local interconnect network (LIN) protocol.

16. The method of claim 15, further comprising the step of:

sending a command to actuate a relay;

monitoring a terminal of the relay to detect a signal;

identifying the relay as either functional or non-functional responsive to the detected signal.

17. The method of claim 16, further comprising the step of:

sending a signal to a passenger compartment-located body control module over a serial data link responsive to identifying the relay as either functional or non-functional.

18. The method of claim 14, wherein the step of converting the second, serial data stream into a third parallel signal comprises the steps of:

receiving a predetermined serial data stream at a serial data interface;

converting the predetermined serial data stream into a predetermined command for a processor located at the engine compartment-located relay monitor;

sending a predetermined signal to a predetermined relay responsive to converting the predetermined serial data stream into a predetermined command.

* * * * *